US005240276A

United States Patent [19]

Coombs

[11] Patent Number: 5,240,276

[45] Date of Patent: Aug. 31, 1993

[54] INTERLOCKING FOLDABLE WHEELCHAIR CONSTRUCTION

[76] Inventor: Franklyn K. Coombs, 235 Twinspur Ct., Roswell, Ga. 30076

[21] Appl. No.: 885,834

[22] Filed: May 20, 1992

[51] Int. Cl.[5] ............ B62B 11/00

[52] U.S. Cl. ............ 280/647; 297/42

[58] Field of Search ............ 280/250.1, 304.1, 39, 280/40, 647, 650, 657, 658; 297/DIG. 4, 42, 44

[56] References Cited

U.S. PATENT DOCUMENTS 4,625,984 12/1986 Kitrell ............ 280/650
4,770,432 9/1988 Wagner ............ 280/650
4,813,693 3/1989 Lockard et al. ............ 280/650
4,917,395 4/1990 Gabriele ............ 280/650

*Primary Examiner*—Richard M. Camby
*Attorney, Agent, or Firm*—Sherman and Shalloway

[57] ABSTRACT

A foldable wheelchair having a light weight construction employing an interlocking mechanism between the individual parts to provide a wheelchair of improved structural stability without a separate frame assembly. The wheelchair comprises molded panels, which are interchangeable, and support elements, also interchangeable, the entire assembly being connected together by means of interlocking buttons and pins or rods.

19 Claims, 6 Drawing Sheets

INTERLOCKING FOLDABLE WHEELCHAIR CONSTRUCTION

FIELD OF THE INVENTION

The present invention relates to a foldable wheelchair having an improved, lightweight construction employing an interlocking technique. More particularly, it relates to a wheelchair construction comprising substantially rigid panels connected by an interlocking button and rod means to produce a folding wheelchair without a separate framework.

BACKGROUND OF THE INVENTION

Standard wheelchair construction comprises a welded tubular metal frame having seat and back elements of flexible material or fabric spanning the space between either side of the frame. Although foldable and of relatively light weight, such construction is inherently unstable and subject to weakening and breakage, predominantly at the weld locations and through the fabric elements. Furthermore, the initial construction and subsequent repair of such wheelchairs is expensive and requires technical expertise associated with bending and welding of tubular steel.

The present invention provides a simple and inexpensive construction for a wheelchair which may be assembled by relatively unskilled persons and which permits easy repair of broken parts. These parts include left and right side panels and at least two seat panels which together form the primary structure of the chair. These panels are made of a substantially rigid material, preferably injection molded polymer resin, and are held together in a chair configuration by means of interlocking fasteners. Additional frame stability is achieved by an interlocking pivotable lower support member, and a foldable stay member between the side panels. Wheels are attached in a conventional manner which permits vertical adjustment of the chair.

Foldable wheelchairs made from modular panels have been proposed before; however, they suffer from various drawbacks or design deficiencies. For example, U.S. Pat. No. 4,625,984 to Kitrell, discloses a folding wheelchair having two side frames connected by hinged foot and back panels. This design, however, includes a tubular metal framework in the side frames and requires that the seat be totally removed in order to fold. Furthermore, a wheel and belt motive system adds to the complexity of the construction.

U.S. Pat. No. 4,770,432 to Wagner, discloses a foldable wheelchair constructed of panels of skinned polymeric foam which are secured together by piano type hinges. These hinges require continued maintenance and add to the skill and cost required in assembly and maintenance.

U.S. Pat. No. 4,917,395 to Gabriele, discloses a wheelchair having a hinge construction between the side panels and seat and back panels which is an integrally molded part of the respective panels providing both bearing and support surfaces. Although providing relative ease of assembly, such an integral hinge means requires complete replacement of a panel should one portion of a hinge surface fail thus increasing the cost of repair. Additionally, individual parts of this construction are not interchangeable from left to right.

Thus, there is a need for a foldable wheelchair construction which is simple, rugged and inexpensive and requires little skill to construct or maintain. The wheelchair of the present invention provides such a construction with the added convenience of being adaptable to almost any material from wood to metal to plastic and which provides for relative ease of assembly and maintenance.

SUMMARY OF THE INVENTION

As described, the wheelchair of this invention is particularly adapted for ease of construction and maintenance by relatively unskilled persons and comprises side and seat panels, preferably of molded material, connected together in interlocking fashion by means of easily installed and replaced buttons and rods. The combination of these interlocking buttons and rods provides an improved structural stability whereby a stable vertical alignment is maintained at all times to reduce rolling resistance and tire drag. This, in turn, virtually eliminates the primary causes of wheelchair failure or repair which are wheel bearing failure, seat fabric replacement and frame cracks or broken welds brought about by excessive horizontal forces in the frame.

The primary pieces in the wheelchair construction of this invention are the two side panels and at least two seat panels which are hinged together. Each of the seat panels is hinged to one of the side panels by the interlocking buttons and rods and, when the chair is open, are at right angles to the side pieces. The interlock between the seat panels and the buttons and rods forms a tension/compression balance between the side pieces and the interlocking buttons and rods which prevents the seat from collapsing and reinforces the structural stability of the chair.

It is therefore an object of this invention to provide a foldable wheelchair construction which is easily assembled and repaired.

It is a further object to provide such a construction which results in a foldable wheelchair having improved structural stability.

It is a still further object to provide a foldable wheelchair construction which is fabricated from molded parts without welding or screws to maintain its structural integrity.

And it is an even further object to provide a foldable wheelchair construction which is lightweight and employs an interlocking button and rod technique for its assembly, whereby such assembly and subsequent maintenance and repair are easily accomplished by persons without specialized skills.

Further objects and advantages will become evident from the following drawings and description.

DETAILED DESCRIPTION OF THE INVENTION

Figure 1:
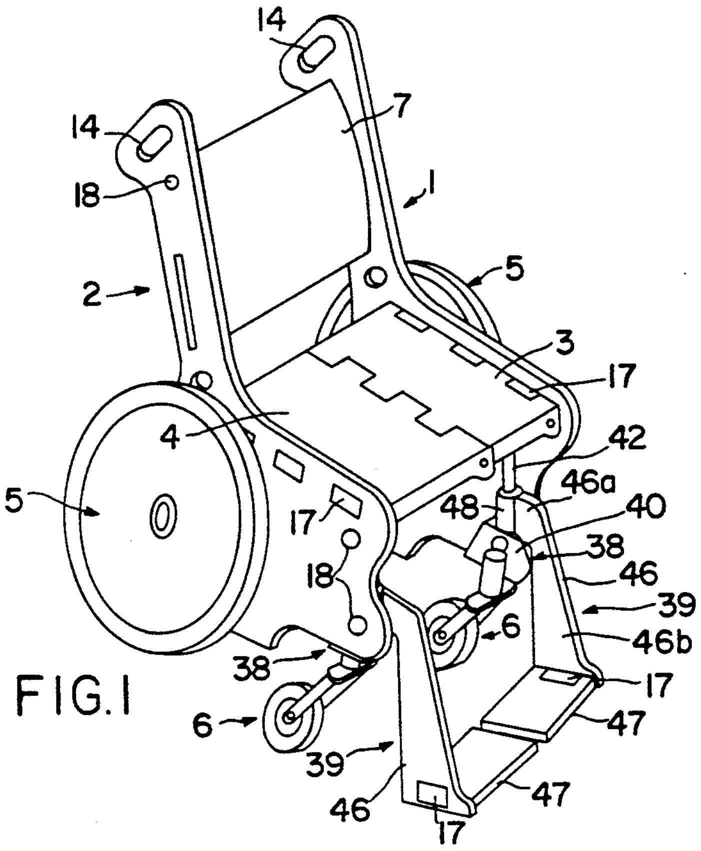
FIG. 1 is an oblique view of a wheelchair constructed according to the present invention with arm rest assemblies removed for clarity.
Figure 2:
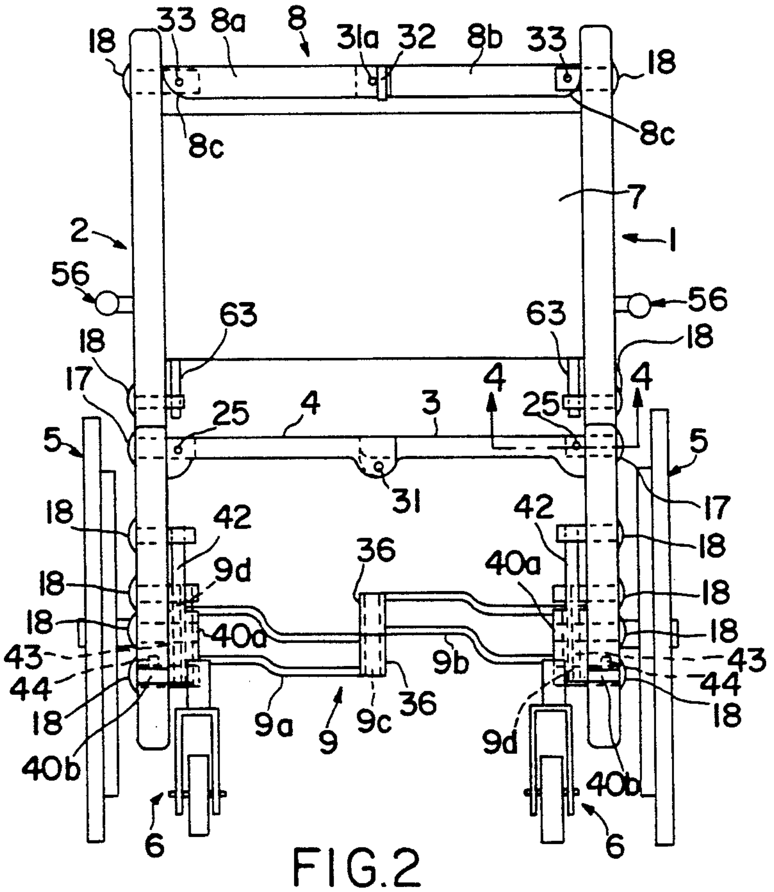
FIG. 2 is a front view of the wheelchair of FIG. 1 with foot rest assemblies removed for clarity.

The wheelchair construction of the present invention eliminates the need for a welded frame and, instead, comprises left and right side panels 1, 2 and at least one each of left and right seat panels 3, 4. Each side panel 1, 2 has attached to it a large diameter rear wheel assembly 5, and a small diameter, vertically pivotable, front caster wheel assembly 6. As shown in FIGS. 1 and 2, the overall construction also includes a back support 7 connected to each side panel 1, 2 and spanning the space between upwardly extending portions of those panels when the chair is erected. Back support 7 is preferably a flexible material, such as a textile fabric, as normally used in tubular frame wheelchairs. A further foldable stay member 8 is positioned between the upwardly extending portions of each side panel 1, 2 and folds downward about the center pivot 31*a* when the chair is folded. A simple spring latch 32 or detent locks the stay member 8 in place when the chair is erected for use. A pivotable lower support assembly 9 is positioned between side panels 1, 2 beneath seat panels 3, 4. This assembly 9 provides additional vertical stability to the side panels 1, 2 and prevents the weight of the user from spreading the lower half of the chair out of vertical alignment.

Figure 7:
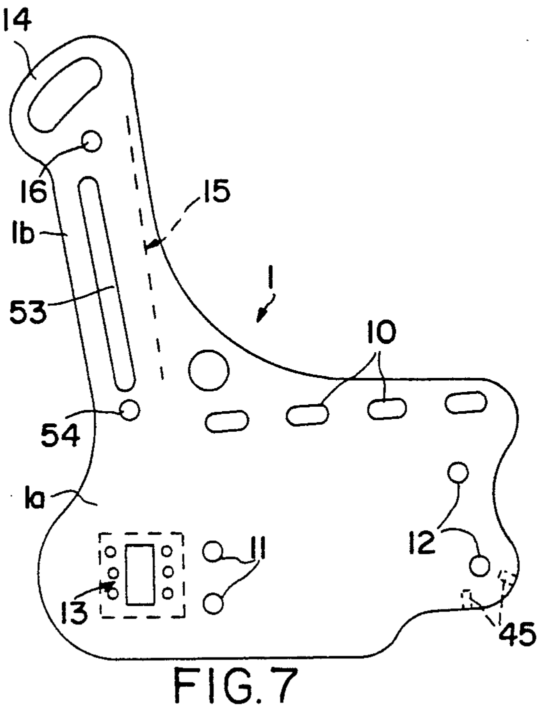
FIG. 7 is a planar view of a side panel of the wheelchair construction of the present invention.

FIG. 7 illustrates the basic configuration of side panels 1, 2, arbitrarily left side panel 1 of FIG. 1; right side panel 2 is identical, side panels 1, 2 being formed so as to be interchangeable. Side panel 1 is substantially L-shaped comprising a lower portion 1*a* having attachment areas for seat panels 3, 4, lower support 9, front caster and rear wheel assemblies 5, 6 and footrest assemblies 38, and an upstanding portion 1*b* providing handles 14 and attachment locations for backrest 7, folding stay 8 and arm rest assemblies 56.

As noted previously, the construction method employs buttons and rods which interlock with and secure seat panels 3, 4, lower support assembly 9, foldable stay 8, front caster assemblies 38, foot rest assemblies 39 and arm rest assemblies 56 to side panels 1, 2. Accordingly, side panels 1, 2 are provided with apertures therethrough in the attachment areas for the respective buttons. Apertures 10 are for seat panel attachment buttons 17, apertures 11 for lower support 9 attachment, apertures 12 for front caster and footrest assemblies 38, 39 attachment, apertures 13 are for rear wheel assembly 5 attachment and aperture 16 is for foldable stay member 8 attachment. Area 15 along the forward edge of upper portion 1*b* is where backrest 7 is attached. The interlocking construction of this invention may be used for attaching backrest 7. Alternatively, backrest 7 may be attached by other means such as standard screws, a sliding bar and channel, heavy duty snaps, etc. Slot 53 is for attachment of the upper portion of an arm rest and is elongated to allow adjustment of the arm rest height. Aperture 54 adjacent the lower end of slot 53 provides an attachment point for a lower portion of the arm rest which serves to stabilize the upper portion.

Figure 15:
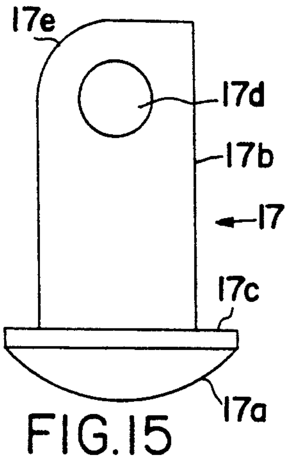
FIG. 15 is a side view of a rectangular seat panel/side panel interlock button employed in the construction of this invention.
Figure 16:
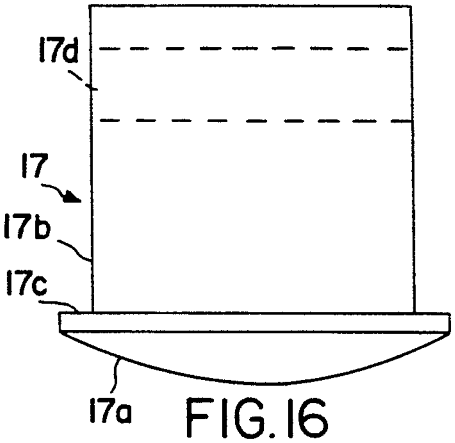
FIG. 16 is a top view of the button of FIG. 15.
Figure 18:
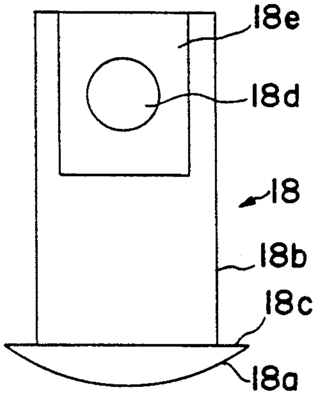
FIG. 18 is a top view of the button of FIG. 17.
Figure 17:
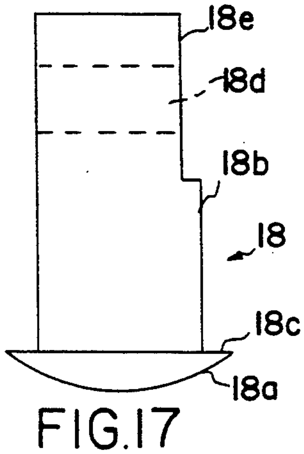
FIG. 17 is a side view of a cylindrical support member interlock button employed in the construction of this invention.
Figure 19:
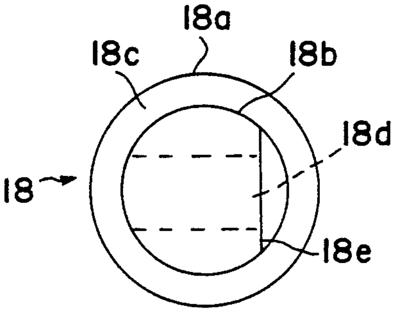
FIG. 19 is an end view of the button of FIG. 17.
Figure 22:
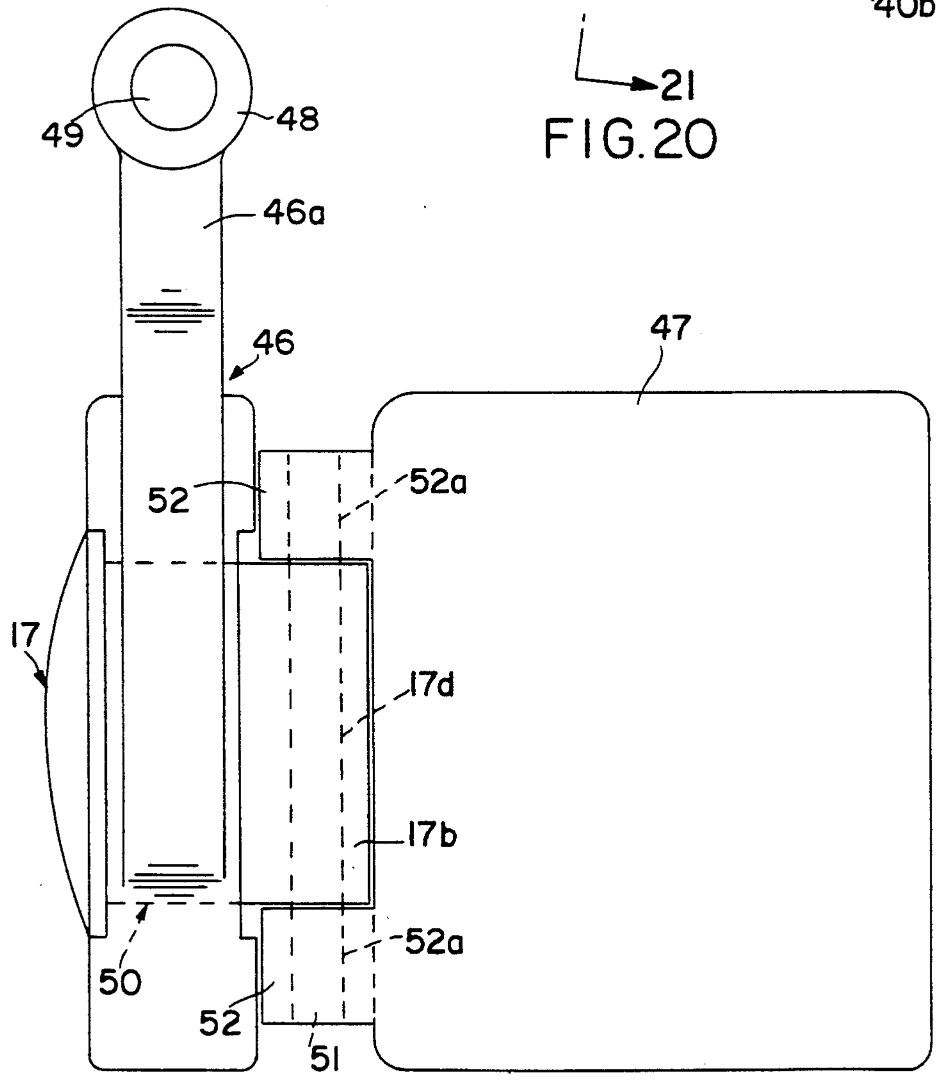
FIG. 22 is a top view of a foot rest assembly of the wheelchair of this invention.

FIGS. 15 through 19 illustrate the two types of buttons employed in the wheelchair construction of this invention; rectangular seat panel attachment buttons 17 in FIGS. 15 and 16, and cylindrical support member buttons 18 in FIGS. 17 through 19. Both types of buttons comprise an enlarged head 17*a*, 18*a* and an elongated shaft 17*b*, 18*b* extending therefrom. The heads 17*a*, 18*a* are enlarged to extend laterally beyond the shafts 17*b*, 18*b* and thereby form a perimeter flange 17*c*, 18*c* which butts against the surface of side panel 1, 2 when the buttons are inserted through the respective apertures of panels 1, 2. Shafts 17*b*, 18*b* are preferably about two inches long and the perimeter flanges 17*c*, 18*c* of heads 17*a*, 18*a* preferably extend at least one quarter inch beyond the shaft surfaces. Rectangular buttons 17 are also used in the foot rest assemblies as shown in FIG. 22.

As shown by FIGS. 17 and 18, cylindrical buttons 18 have a substantially uniform size, the shaft 18*b* being a right cylinder preferably one inch in diameter. A flat surface 18*e* about one-eighth inch deep is cut into the end of the cylinder opposite head 18*a*. This flat surface 18*e* runs parallel to the central axis of shaft 18*b* and is about one half the length thereof. In contrast, rectangular buttons 17 have a shaft 17*b* which has a greater width than thickness, preferably in a ratio of 2:1 with a width of two inches and a thickness of one inch. The upper edge of the end of shaft 17*b* opposite the head 17*a* has a radius 17*e* while the lower end edge is square. Each type of button is also provided with a through channel 17*d*, 18*d* through its width at the end thereof opposite the head 17*a*, 18*a*. The end of shaft 18*b* of cylindrical support button 18 is preferably left square and channel 18*d* is perpendicular to flat surface 18*e* which provides an orientation and smooth surface for pieces that rotate about a rod inserted in channel 18*d*. These channels in the buttons accept attachment rods whereby the various panels or support members are secured to their respective side panels 1, 2. Attachment rods preferably have a knurled surface for a tight press-fit within channels 17*d*, 18*d*, of the buttons. Alternatively, other means of maintaining the rods in place, such as cotter pins or c-clips may be used.

Figure 3:
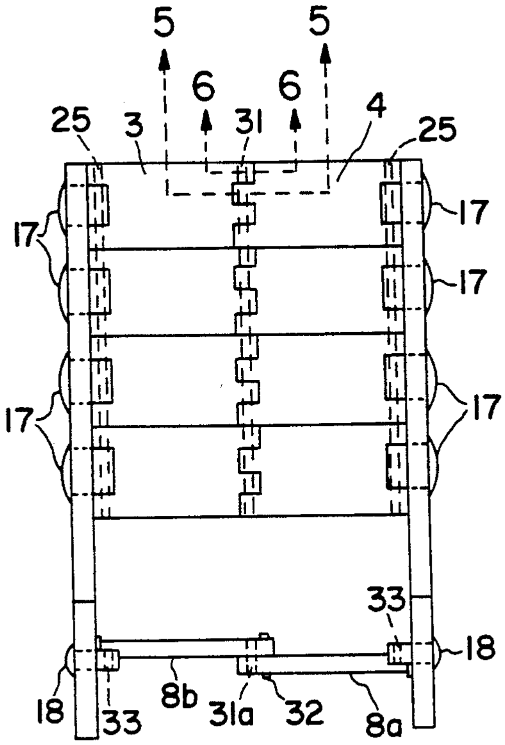
FIG. 3 is a top view of a wheelchair of the present invention illustrating an alternative seat construction.
Figure 8:
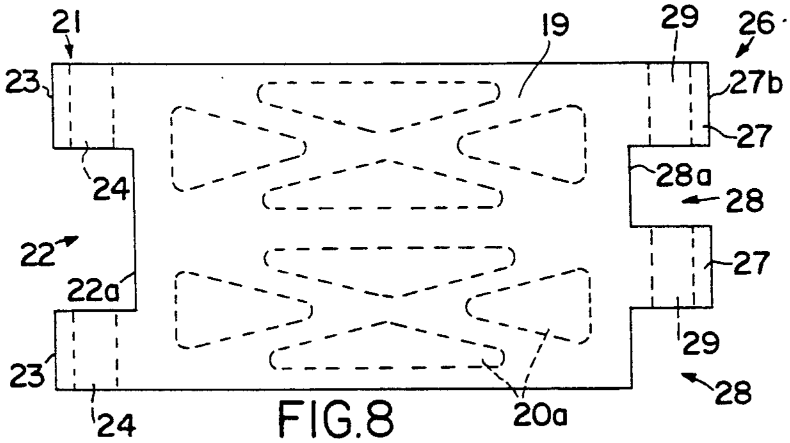
FIG. 8 is a planar top view of a seat panel of the wheelchair construction of FIG. 3.
Figure 9:
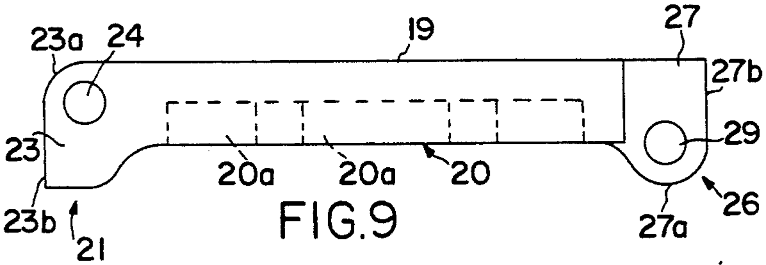
FIG. 9 is a planar side view of the seat panel of FIG. 8.
Figure 10:
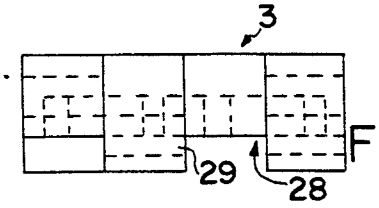
FIG. 10 is a planar end view of the seat panel of FIG. 8.
Figure 4:
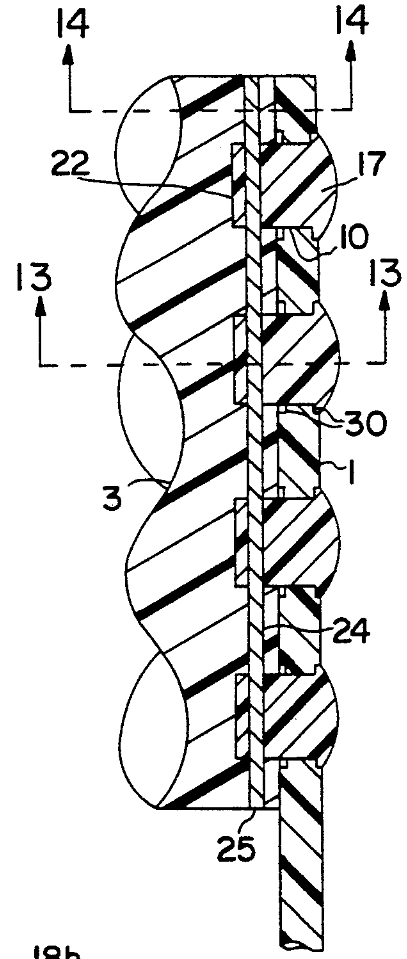
FIG. 4 is a cross section of a seat panel/side panel interlocking construction taken along line 4—4 of FIG. 2.

FIGS. 8 through 10 illustrate a preferred form of seat panels 3, 4 as used in the embodiment of FIG. 3 and the following description, though given in terms of side panel 1 and seat panel 3, is applicable to either left 3 or right 4 seat panels and their attachment to left 1 or right 2 side panels, inasmuch as seat panels 3, 4, like side panels 1, 2, are identical. The seat portion of the chair may be constructed from just two panels, left 3 and right 4 as shown in FIG. 1, or from a plurality of narrower panels of the style shown in FIGS. 8 through 10, as shown in the construction of FIG. 3. Whichever style is used, the overall relationship between the left and right seat panels 3, 4 and these panels with their respective side panels 1, 2 is the same. Referring to FIGS. 8–10, each seat panel 3 comprises a molded panel having a planar upper surface 19 and a relieved lower surface 20. The relieved areas 20*a* of lower surface 20, shown by dotted lines in FIGS. 8 and 9, reduce the overall mass of the seat panels 3, 4 without sacrificing strength. A first end 21 of seat panel 3 is fashioned for attachment to side panel 1 by means of rectangular attachment buttons 17 and is provided with a notch 22 corresponding in width and depth to the shaft 17*b* of rectangular attachment button 17 extending through aperture 10 of seat panel 1. On either side of notch 22 are ears 23 which will flank shaft 17*b* of rectangular attachment button 17 when the seat panel 3 and side panel 1 are assembled. Such assembly is shown in cross section in FIGS. 4, 13 and 14. Ears 23 are provided with a horizontal through channel 24 corresponding in size and relative location to channel 17*d* of rectangular button 17 through which an attachment rod 25 is inserted to secure rectangular button 17 to seat panel 3 in a hinging manner. The upper edge 23*a* of ears 23 is given a radius so that seat panel 3 may pivot relative to side panel 1 about the rod 25 which is inserted through channel 24. The radius 17*e* of rectangular button 17 further facilitates this pivoting motion. The end face 23*b* of ears 23 is substantially perpendicular to upper surface 19 to butt against the inner surface of side panel 1 when seat panel 3 is lowered into a position for use. In constructions using only two seat panels, one left 3 and one right 4, the first end 21 of the seat panel will have a plurality of spaced notches 22 corresponding to the number and placement of attachment apertures 10 in side panels 1, 2. This construction is illustrated in FIG. 1. The alternative construction of FIG. 3 employs four narrower panels of the type depicted in FIG. 8 for each side of the seat wherein each seat panel 3, 4 has only one notch 22, the panel dimensions being such that the grouping of panels provides a uniform surface for an occupant to sit on.

Figure 13:
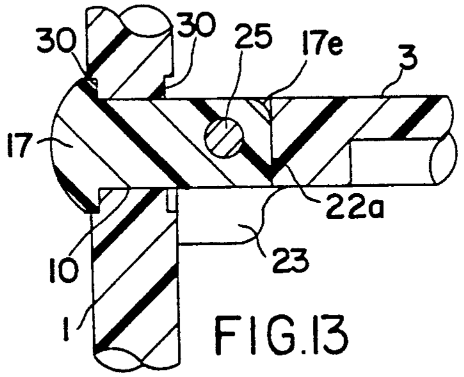
FIG. 13 is a cross section of the seat panel/side panel/button interlock construction of the present invention taken along line 13—13 of FIG. 4.
Figure 14:
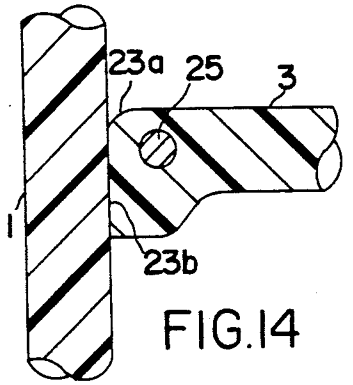
FIG. 14 is a cross section of the seat panel/side panel interlock construction of the present invention taken along line 14—14 of FIG. 4.

FIGS. 13 and 14 are particularly illustrative of the relationship between seat panel 3, side panel 1 and rectangular button 17. Referring to these figures, as well as FIG. 4, it is seen that rectangular attachment buttons 17 are inserted into apertures 10 of side panel 1 from the outer side. Apertures 10 are preferably formed with a recess 30 about their perimeter corresponding to the dimensions of the head 17*a* of rectangular button 17 so that the head 17*a* will be slightly recessed into side panel 1. Because it is preferred that one molded panel can serve as either a left 1 or right 2 side panel, the recess 30 is provided on both sides of the panel 1 as most clearly shown in FIG. 13. The shaft 17*b* of each rectangular button 17 extends through aperture 10 and fits into notch 22 of seat panel 3. When channels 17*d* of rectangular buttons 17 and channel 24 of seat panel 3 are lined up, rod 25 is inserted to secure the assembly and serve as a hinge pin for pivoting of seat panel 3 relative to side panel 1. The radius edges 17*e* and 23*a* of rectangular buttons 17 and seat panel 3 respectively are uppermost so that seat panel 3 will pivot upward relative to side panel 1 when the wheelchair is folded. When the wheelchair is in the open position, the seat panel 3 and side panel 1 will have the relationship shown in FIGS. 13 and 14 with the end surfaces 23*b* of seat panel 3 butting against the inner surface of side panel 1. Furthermore, the inner face 22*a* of notch 22 will butt against the end of shaft 17*b* of rectangular button 17. In this manner a positive stop is provided for seat panel 3 against side panel 1 providing increased support for the user and increased stability to the chair since the force exerted by a person sitting in the chair will be transmitted by seat panel 3 as an outward or pushing lateral force to side panel 1 through ears 23 and as an inward or pulling lateral force through rectangular buttons 17. This combination of outwardly and inwardly directed lateral forces works to provide a tension/compression balance between the side pieces 1, 2 and the seat panels 3, 4 thereby improving structural stability and rigidity by reduction of the horizontal wobble which often occurs in standard tubular frame chairs.

Figure 5:
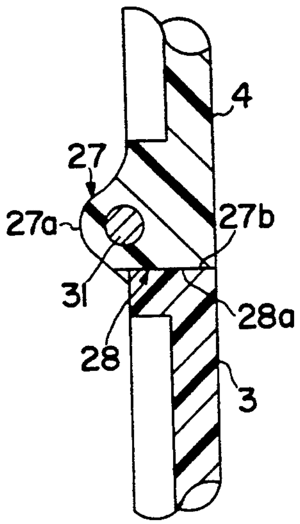
FIG. 5 is a cross section through the interlocking construction of two seat panels taken along line 5—5 of FIG. 3.
Figure 6:
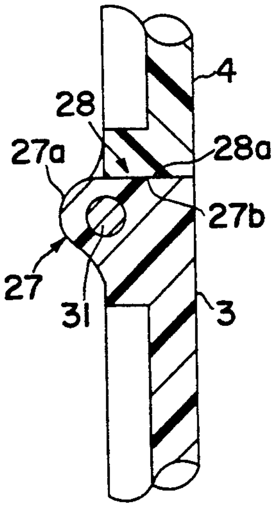
FIG. 6 is a cross section through the interlocking construction of two seat panels taken along line 6—6 of FIG. 3.

The second end 26 of seat panel 3 is provided with a plurality of alternating ears 27 and notches 28 which will mate with corresponding ears and notches on a right side seat panel 4 in an interdigitating manner as shown in FIGS. 1 and 3. The arrangement of ears 27 and notches 28 is such that the same panel may serve as a left 3 or right 4 panel thereby reducing the numbers and varieties of parts required for the chair. Such interdigitation of left and right seat panels 3, 4 provides a hinge structure along the center line of the seat to permit folding when the wheelchair is collapsed. As with ears 23 on the first, side panel attachment, end 21 of seat panel 3, ears 27 have a horizontal through channel 29 which accepts an attachment rod 31 to secure left and right seat panels together and serve as a hinge pin. This relationship is best shown in FIGS. 3, 5 and 6. Since seat panels 3, 4 pivot upwards with respect to side panels 1, 2 when the chair is folded, the respective pivoting of the seat panels to each other about rod 31 is downward. For this reason, the lower edge of interdigitating ears 27 is given a radius 27*a*. To provide a positive stop along the centerline hinge formed by the attachment of seat panels 3, 4 to each other, the end surfaces 27*b* of ears 27 and the inner surfaces 28*a* of notches 28 are each perpendicular to the upper surface 19 of seat panels 3, 4 and butt against each other when the chair is open as shown in FIGS. 5 and 6. FIG. 5 is a cross section through seat panels 3, 4 and shows an ear 27 of seat panel 3 in a notch 28 of seat panel 4, while FIG. 6 is a similar cross section showing an ear 27 of seat panel 4 in a notch 28 of seat panel 3.

As with the securement of attachment rods in buttons 17, 18, rods 25 and 31 are also preferably knurled, at least at the ends, for a tight press-fit within the channels 24 and 29 of the seat panels 3,4.

The button and pin method of interlocking attachment is also used to secure the foldable stay member 8, the lower support assembly 9 and the front caster and foot rest assemblies 38 and 39 to the side panels 1, 2. In each of these instances the cylindrical support buttons 18 depicted in FIGS. 17 through 19 are used.

As shown in FIGS. 2 and 3, foldable stay member 8 comprises two relatively pivoting bars 8*a*, 8*b*, one end of each bar being attached to a respective side panel 1, 2 the opposite ends being joined in pivotal relationship by a common pivot pin 31*a* inserted into lined up apertures, this pin preferably being a rigid plastic and having its ends flared to hold it in place. Pin 31*a* provides a pivot means for foldable stay member 8 in the same manner that rod 31 provides a pivot for seat panels 3, 4. Stay member 8 folds downward when the chair is closed and is provided with a latch means comprising a spring loaded clip 32 or other detent means to secure the bars 8*a*, 8*b* of stay member 8 in a horizontal position when the chair is open. Bars 8*a* and 8*b* are identical, the end opposite the central pivot pin 31*a* aperture being provided with an attachment pivot pin 33 extending perpendicularly therefrom. Pin 33 is sized to fit in the channel 18*d* in shaft 18*b* of cylindrical support buttons 18 which are inserted through aperture 16 in upstanding portion 1*b* of side panel 1. Since side panel 2 is identical to side panel 1 it will have a corresponding aperture 16. Stay 8 is preferably attached relative to panels 1, 2 so that one attachment pivot pin 33 points rearward and the other points forward as is more clearly shown in FIG. 3. Pin 33 may be made so that it is longer than the width of button shafts 18*b* and may be provided with means to prevent it from pulling out of the channels 18*d*. Such means may be in the form of cotter pins inserted through the ends of the pin 33 or C-clips which fit into a circumferential groove in the end of the pin 33. Alternatively, cooperating detents may be provided on the pin 33 and in channels 18*d* to prevent pulling out of pin 33. Or pin 33 may be formed to have a snug, press-fit relationship within channels 18*d* of cylindrical buttons 18 while still permitting rotation therein. Preferably, the outer end of each bar 8*a*, 8*b* is given a radius 8*c* at the lower corner to facilitate the pivoting of these bars relative to the side panels 1, 2 the upper corner being straight to provide a contact surface against panels 1, 2 so bars 8*a* and 8*b* can pivot in only one direction, preferably downward.

Figure 11:
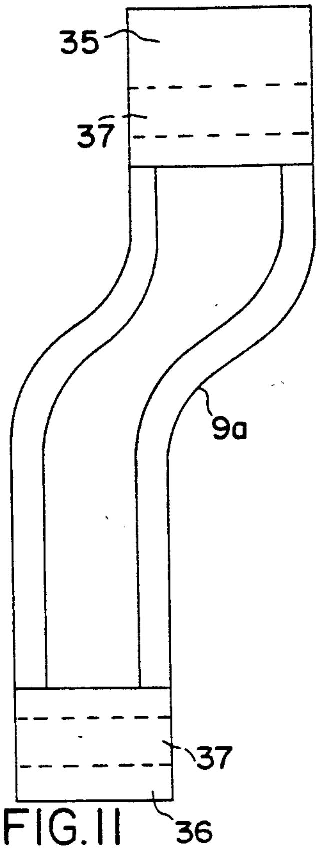
FIG. 11 is a planar side view of a lower support element employed in the wheelchair construction of this invention.
Figure 12:
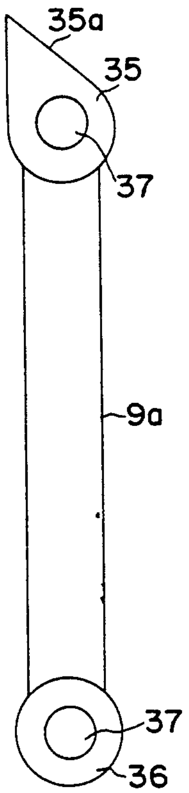
FIG. 12 is a planar top view of the lower support element of FIG. 11.

Lower support assembly 9 is provided for additional support to maintain the vertical alignment of side panels 1, 2 and comprises identical pivot arms 9*a*, 9*b*, support pivot rod 9*c* and attachment pins 9*d*. The arrangement of these parts relative to themselves and the rest of the wheelchair is shown most clearly in FIG. 2 and the detail of the pivot arms themselves is shown in FIGS. 11 and 12. As is readily seen, pivot arms 9*a*, 9*b* are elongated members, the ends of which are laterally displaced relative to each other about the mid-point of the arm thus giving each arm a modified "S" shape. Each end of arm 9*a*, 9*b* has a body 35, 36 each of which is provided with a through channel 37 perpendicular to the longitudinal axis of the arm 9*a*, 9*b* and in the plane of the lateral displacement. In this manner when the support 9 is assembled as shown in FIG. 2, each arm will have a low end and a high end with channels 37 in each knob being vertically oriented. Body 35 of each arm 9*a*, 9*b*, which will be the outer end, is provided with a flat stay surface 35*a* to butt against the surface of side panels 1, 2 when the chair is open thereby assisting in maintaining proper spacing of side panels 1, 2 and providing added stability. Inasmuch as arms 9*a*, 9*b* are identical, only one part type need actually be fabricated, the two arms 9*a*, 9*b* comprising lower support assembly 9 merely being inverted relative to each other. Furthermore, channels 37 preferably have a diameter identical to that of channel 18*d* in shaft 18*b* of cylindrical button 18 which button type is used to attach support assembly 9 to side panels 1, 2.

The central pivot element of lower support assembly 9 is support pivot rod 9*c* which comprises a rod sized to fit within through channels 37 of bodies 36 of arms 9*a*, 9*b*. Pivot rod 9*c* fits into aligned channels 37 of bodies 36 of arms 9*a* and 9*b* respectively as shown in FIG. 2, the arms being free to pivot thereabout. As with the attachment of stay 8 and pin 31*a* described above, the ends of pivot rod 9*c* may be enlarged to hold rod 9*c* in place. Alternatively, pivot rod 9*c* and bodies 36 may have cooperating detents or other locking means or may rely on a snug fit to maintain relative positions and prevent arms 9*a*, 9*b* and support pivot rod 9*c* from separating. The outer ends of arms 9*a*, 9*b* attach to side panels 1, 2 by means of attachment pins 9*d* inserted into the channels 37 in the respective bodies 35, the ends of pins 9*d* being confined in channels 18*d* of upper and lower cylindrical buttons 18 inserted through apertures 11 in side panels 1, 2. Arms 9*a*, 9*b* are free to pivot about pins 9*d* while pins 9*d* are preferably secured into channels 18*d* by means of cooperating detents or locking pins, clips or a press-fit as in the manner of pins 33 of stay 8 or seat attachment rods 25 and 31. As with the other buttons 17 and 18 used to fasten seat panels 3, 4 and stay 8 to side panels 1, 2, cylindrical buttons 18 used to hold pins 9*d* and, thereby, secure support assembly 9 to side panels 1, 2 are inserted through their respective apertures 11 in side panels 1, 2 from the outer side of each panel.

Figure 21:
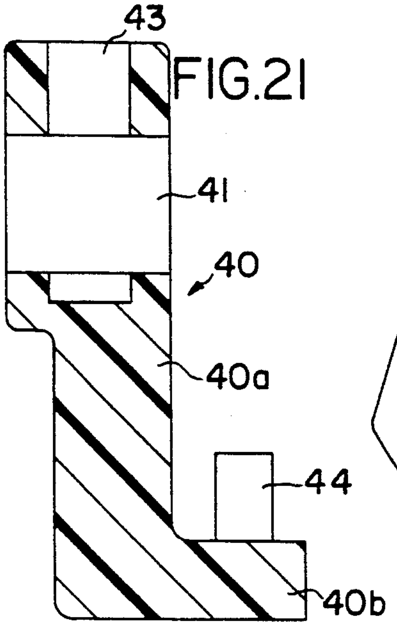
FIG. 21 is a longitudinal cross-section of the caster plate taken through line 21—21 of FIG. 20.
Figure 20:
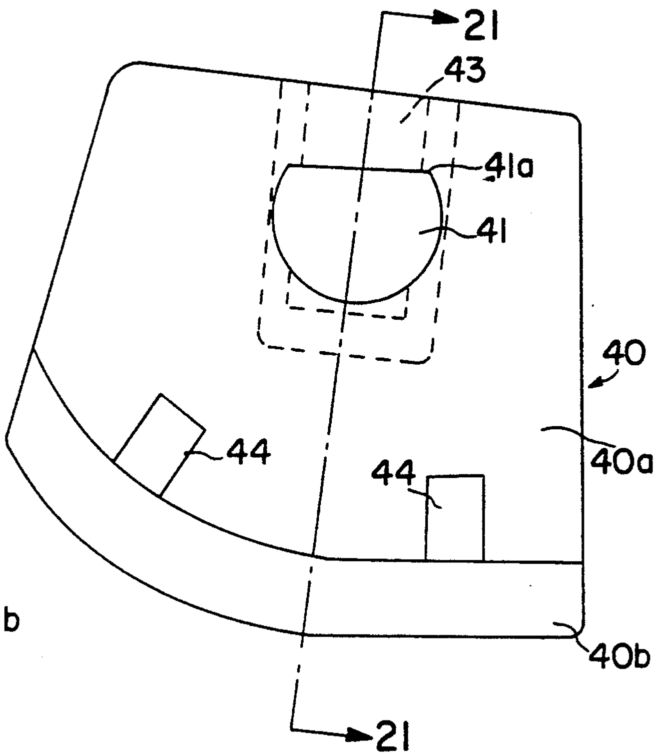
FIG. 20 is a planar view of a front caster plate of the wheelchair of this invention.

The caster wheel assemblies 38 for each side panel 1, 2 comprise a caster plate 40 and caster wheel 6 attached to the inner face of each side panel as shown in FIG. 1. The assembly is held in place against the inner surface of the side panel by a cylindrical button 18 passing through the lower of apertures 12 in the side panel and aperture 41 in the caster plate 40. An interconnect rod 42 is inserted into channel 43 in caster plate 40 and through channel 18*d* of cylindrical button 18. Aperture 41 in caster plate 40 is provided with a flat 41*a* corresponding to surface 18*e* on cylindrical button 18 so that channel 18*d* is properly oriented with channel 43 to accept interconnect rod 42. The other end of interconnect rod 42 mates with channel 18*d* of a cylindrical button 18 inserted in the upper one of apertures 12 in the side panel. Upper and lower apertures 12 are oriented so as to be in line at an angle of 13° rearward of vertical. As with the other attachment rods, interconnect rod 42 is provided with means to ensure its retention by cylindrical buttons 18 and caster plate 40. These means are preferably such as to provide a tight press-fit in the channels 18*d* and channel 43 and may comprise knurling of the rod or other means of expanding the end portions of the rod for a tight fit or cooperating detents. As shown in FIGS. 20 and 21, the caster plates 40 themselves comprise a substantially trapezoidal plate body 40*a*, the wider edge of which is curved to correspond to the curvature of the lower forward corner of side panels 1, 2. Extending laterally from plate body 40*a* along this edge is flange 40*b* which will butt against the lower front edge of side panels 1, 2. Flange 40*b* is provided with two locating pins 44 which extend upward therefrom and engage corresponding holes 45 in the lower front edge of side panels 1, 2 to accurately position caster plates 40 relative to side panels 1, 2. Unlike the other elements of this wheelchair, caster plates 40 are formed as individual right and left units, although the fabrication procedure is identical for each.

The caster assemblies 38 together with the interconnect rods 42 and cylindrical buttons 18 used to attach them to side panels 1, 2 reinforce the lower front corner of the side panels by effectively doubling the thickness of the panels at that point. Such reinforcement is necessary in view of the severe stress and vibration to which the forward corners are subjected. The caster wheels 6 like the rear wheels 5 are attached to metal plates which can be adjusted for the proper height with the rear wheels. Preferably, three height adjustments are provided to correspond with those of the rear wheels, such attachment and height adjustment preferably comprising bolts penetrating the side panels 1, 2 and caster plates 40.

Associated with the caster assemblies 38 are foot rest assemblies 39 comprising a foot rest attachment arm 46 and foot rest plate 47. As with side panels 1, 2 and seat panels 3, 4, foot rest attachment arm 46 and plate 47 are identical pieces for both left and right sides. Foot rest attachment arm 46 comprises a substantially inverted "L" shaped piece wherein the horizontal arm 46*a* has a cylindrical end 48, the longitudinal axis of which is substantially parallel to the axis of the vertical arm 46*b*. The cylindrical end 48 has a longitudinal through channel 49 with a diameter corresponding to that of the interconnect rods 42 of the caster assemblies 38. The opposite end of the foot rest attachment arm 46 is provided with an aperture 50 sized to accept the shaft 17*b* of a rectangular button 17 for attachment of foot rest plate 47.

Foot rest plate 47 is similar to seat panels 3, 4 and is pivotally mounted to the lower end of foot rest attachment arm 46 by button 17 and attachment rod 51 in the same manner that seat panels 3, 4 are attached to side panels 1, 2. The primary difference is that left and right foot rest plates 47 are not connected to each other at their adjacent edges as seat panels 3, 4 are. Each foot rest plate 47 comprises a substantially rectangular panel, one short edge of which is provided with a pair of ears 52 which are spaced apart a distance corresponding to the width of button shaft 17*b*. Horizontal through channels 52*a* in ears 52 correspond to channel 17*d* of rectangular button 17 to accept an attachment rod 51. As with other such rods in this construction, rod 51 is provided with means to cause its retention within the through channels 52*a* and channel 17*d* while permitting foot rest plate 47 to pivot relative to attachment arm 46. Preferably, such means comprises knurled portions at the ends of rod 51 within through channels 52*a*. Other means may include cotter pins, c-clips, detents and the like. Ears 52 have a radius on their upper edges permitting plate 47 to pivot relative to arm 46 and a perpendicular end face to butt against the surface of arm 46 when plate 47 is lowered to its use position in the same manner as ends 21 of seat panels 3, 4.

Foot rest assemblies 39 are attached to the wheel chair at the time caster wheel assemblies 38 are mounted, the interconnect rods 42 passing through longitudinal through channels 49 of foot rest attachment arms 46. In this manner, foot rest assemblies 39 are maintained at the same angle of 13° relative to the vertical as caster assembly interconnect rods 42, this angle provides the most comfortable position for the feet in relation to the seat of the wheelchair. Foot rest assemblies 39 are also capable of pivoting about interconnect rods 42 into a storage position underneath the wheelchair seat with foot rest plates 47 pivoted upward against their respective attachment arms 46. The height of foot rest assemblies 39 is adjustable by sliding the attachment arms 46 up or down the interconnect rods 42, any height above the caster plate 40 being maintained by means of "C" shaped collars snapped over the rod between caster plate 40 and cylindrical end 48 of foot rest attachment arm 46. The "C" shaped collars may be provided in various lengths; however ½" segments should normally be sufficient to provide variable heights with multiple segments being stacked for greater heights.

Figure 25:
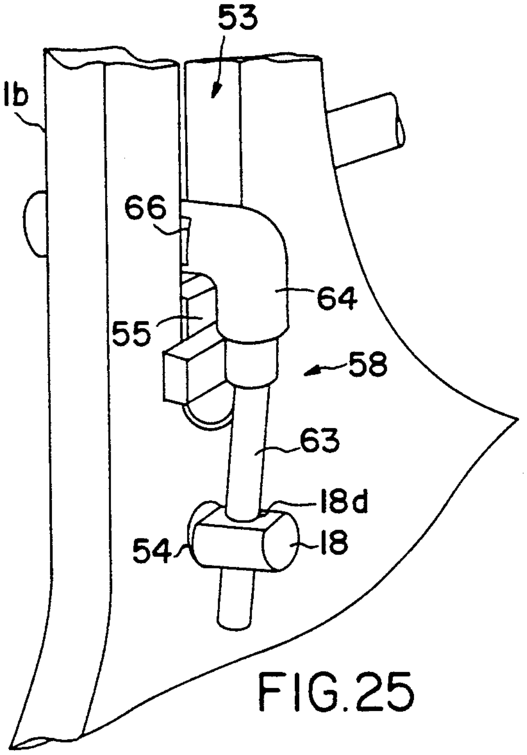
FIG. 25 is a detail view of the attachment of armrest assembly to the wheelchair.
Figure 23:
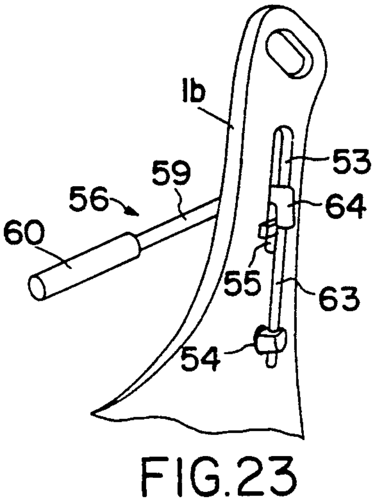
FIG. 23 is an oblique view of the upstanding portion of a side panel illustrating the arm rest assembly of the wheelchair.

Slot 53 and aperture 54 in upstanding portion 1*b* of side panel 1 provide an attachment location for armrest assembly 56 as shown in FIG. 23. The height of arm rest assembly 56 is adjustable within the length of slot 53 by means of plug 55 insertable in slot 53 as shown in FIGS. 23 and 25. As with the collars used to adjust the height of the foot rest assemblies, plug 55 is preferably provided in ½" segments which can be snapped together as needed.

Figure 24:
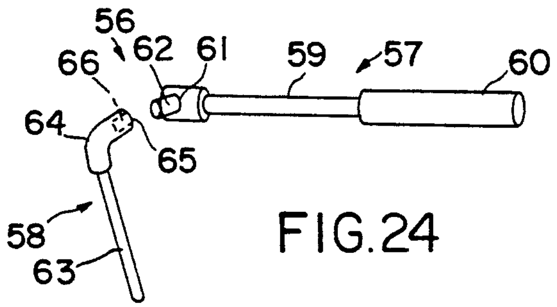
FIG. 24 is an exploded oblique view of the armrest assembly of FIG. 23.

Referring to FIG. 24, it is seen that arm rest assembly 56 comprises two portions; arm rest 57 and support rod 58. Arm rest 57 preferably comprises an elongated rod 59 one end of which is padded 60 preferably with a foam material. At the opposite end of rod 59 from padding 60 is fitting 61 which comprises pin 62 extending perpendicularly to the axis of armrest 57. Support rod 58 likewise comprises an elongated rod 63 having a fitting 64 at one end. In this instance fitting 64 comprises a 90° member with rod 63 inserted into one end while the opposite end comprises a socket 65 sized to accept pin 62. Preferably, pin 62 and socket end 65 of fitting 64 include cooperating means whereby pin 62 and socket 65 interconnect in a locking manner to permit arm rest 57 and support rod 58 to be assembled for use on the right or left side of the wheelchair. This cooperating means may take the form of a twist-lock or bayonet mechanism employing lugs on pin 62 which mate in slots in the interior of socket 65. Other interconnect means may be employed as long as they permit assembly of armrest 57 and support rod 58 in one of two orientations for right or left side usage and allow relative rotation of arm rest 57 and support rod 58 from vertical to horizontal but limit such rotation so that, when in the down position, arm rest 57 is parallel to seat panels 3, 4 when the chair is open. Preferably, the vertical position is such that arm rest 57 will be parallel to upper portion 1*b* of side panel 1. also, arm rest 57 is preferably of sufficient length to extend forward to a point substantially even with the front edge of the wheelchair.

Arm rest assembly 56 attaches to the wheelchair by means of a cylindrical support button 18 inserted through aperture 54 in upstanding portion 1*b*. Armrest assembly 56 is inserted through slot 53 from the outer surface of side panel 1 so that support rod 58 extends downward adjacent the inner surface of side panel 1. Cylindrical support button 18 is inserted through aperture 54 with through channel 18*d* oriented to accept rod 63 as shown in FIG. 25. Rod 63 is of sufficient length to engage button 18 even when armrest 56 is adjusted to the maximum height allowable by the length of slot 53, such adjustment being effected by means of plug 55 against which fitting 64 rests. An alternative procedure for assembly of armrest assembly 56 to the wheelchair comprises inserting button 18 through aperture 54 followed by insertion of rod 63 into through channel 18*d* so that socket end 65 of fitting 64 extends through slot 53. In this instance, fitting 64 may be provided with flattened areas 66 on opposite sides to key fitting 64 into slot 53. Armrest 57 is then connected to support rod 58 by means of pin 62 and its related interconnect means.

Backrest 7 comprises a flexible fabric panel sized to span the space between the upstanding portions 1*b*, 2*b* of side panels 1, 2 forward of slot 53 and armrest support rod 58 to provide support for the occupant's back. This panel may be provided with mounting strips on each end whereby the panel is attached to side panels 1, 2. The simplest method of attaching backrest 7 to side panels 1, 2 is to make these mounting strips out of a material which will accept and hold screws and to attach the backrest 7 by means of such screws driven through side panels 1, 2 at the backrest mounting location 15 and into the mounting strips. Alternatively, snaps or other fastening means as currently employed in wheel chair construction may be used to attach backrest 7.

Rear wheels 5 are attached to side panels 1, 2 at location 13 thereof which is preferably internally reinforced. Attachment is by means of a standard anodized aluminum plate which fits into the recess at location 13 and is held in place by bolts passing through the plate and the panel. Multiple holes are provided in the side panel to allow adjustment of wheel height.

Alternatively, front casters 6 may be attached to panels 1, 2 in the same manner as rear wheels 5 by means of metal plates bolted directly to panels 1, 2 without the benefit of intervening caster plates 40. In this instance interconnect rods 42 and the associated cylindrical support buttons 18 inserted in apertures 12 will serve only to provide pivoting attachment of foot rest assemblies 39 to side panels 1, 2. This method of attachment of casters 6 should be used only when the construction and material of side panels 1, 2 is of sufficient strength to take the stress and vibration to which the forward corners of the panels are subjected.

The above described construction provides a wheelchair which is both sturdy and inexpensive to maintain and repair. In addition, the chair is foldable to permit storage or transportation in a flat folded condition. When the chair is to be folded, the latch 32 on support stay 8 is released and the two side panels 1, 2 brought together. Backrest 7, being of a flexible material, will fold easily as stay 8 folds downward about pins 33, the individual bars 8*a*, 8*b* of stay 8 folding downward relative to each other about pivot pin 31. At the same time, seat panels 3, 4 pivot upward relative to panels 1, 2 about rods 25 and fold downward relative to each other about rod 31. Meanwhile, support assembly 9 will fold forwardly or rearwardly, the arms 9*a*, 9*b* pivoting relative to each other about pivot support 9*c* and relative to side panels 1, 2 about pins 9*d*. Unfolding the chair reverses the action of the parts with the stay 8 and seat panels 3, 4 opening out to their extended positions and the support assembly 9 pivoting out to its central position under the seat panels, the stay surfaces 35*a* of each arm butting against their respective side panels 1, 2 thus restricting further spreading of the lower portions of side panels 1, 2 and maintaining vertical stability of the chair. At full extension latch 32 on stay 8 will lock the stay and the chair in the open position. Furthermore, the weight of the occupant applied to the seat panels 3, 4 will set up the tension/compression force balance between the seat panels 3, 4 and side panels 1, 2 through the abutting end faces 23*b* of ears 23 and the inner surfaces of side panels 1, 2 and between the heads 17*a* of buttons 17 and the outer surfaces of panels 1, 2.

In the event a part needs replacing it is a simple matter to disassemble the chair, replace the part and reassemble the chair. In fact, in most instances complete disassembly would not be necessary. For example, if a seat panel required replacement it would only be necessary to remove rod 31 and one of rods 25, depending on whether it was a left or right seat panel, remove the defective panel and replace it with a new one, followed by reinsertion of the rods.

The side panels, seat panels, foot rest elements, caster plates, support members, connector buttons and attachment and interconnect rods may be fabricated from a variety of rigid materials such as wood, plastic, metal, reinforced plastics, composites and the like. Preferably, the panels, plates, supports, and buttons are molded from reinforced polymers with the side panels preferably shaped by compression molding over a reinforcing core. The attachment and interconnect rods are preferably steel but may be reinforced polymer or the like so long as they possess sufficient rigidity.

The foregoing is a description of the preferred embodiment of the wheelchair construction of the present invention. Other embodiments and modifications will be apparent to those of ordinary skill in the art in light of the foregoing description and are deemed to be included within the scope of the following claims.

What is claimed is:

1. A foldable wheelchair construction comprising:
left and right side panel,
left and right seat panels,
left and right front wheel assemblies,
left and right rear wheel assemblies and,
a backrest,
wherein said left and right seat panels are identical and interchangeable and said left and right side panels are identical and interchangeable, said side panels having an L-shape comprising a substantially rectangular lower portion and an upstanding portion extending substantially vertically from one corner of said lower portion, said side panels further having through apertures accepting individual interlocking connector elements inserted therethrough whereby said seat panels, said front wheel assemblies and said backrest are connected in a manner to form a chair structure, said seat panels being hingedly connected to each other and hingedly connected to the lower portions of said side panels by means of said interlocking connector elements, said connection of said seat panels and said side panels being adjacent an upper edge of the lower portion of said side panels and forward of said upstanding portion, whereby said interlocking connector elements comprise individual elongated members extending through said apertures and cooperating with an edge of said seat panels to form a hinge, said backrest being connected between said upstanding portions.

2. The wheelchair construction of claim 1 further comprising a foldable upper stay member and a pivotable lower support assembly, said foldable stay member being connected between said upstanding portions of left and right side panels behind said backrest and said lower support assembly being connected between said lower portions of said left and right side panels beneath said seat panels, said connection of said foldable stay member and said lower support assembly to said side panels being achieved by means of said interlocking connector elements, said side panels having through apertures therein for receiving said connector elements located in said upstanding portions and said lower portions.

3. The wheelchair construction of claim 2 wherein said interlocking connector elements comprise an elongated shaft having width and thickness dimensions and at one end thereof a head, said head having a flange extending laterally beyond the perimeter of said shaft, the end of said shaft opposite said head having a channel through the width of said shaft.

4. The wheelchair construction of claim 3 wherein said connector elements are provided in first and second sizes, said first size having a shaft with a width greater than its thickness, and one end edge of said shaft adjacent and parallel to said channel having a radius; said second size of said connector elements having a cylindrical shaft, the end of said shaft opposite said head having a flat surface cut therein perpendicular to said channel.

5. The wheelchair construction of claim 4 wherein said first size connector elements attach said seat panels to said side panels and said second connector elements attach said foldable upper stay member, said lower support assembly and said front wheel assemblies to said side panels.

6. The wheelchair construction of claim 5 wherein said apertures in said side panels are of a size to accept said shafts of said connector elements and wherein said shafts of said connector elements pass through said apertures in said side panels from one side thereof to the other, said flanges of said connector element heads butting against the surface of said side panels, said channels in said shafts being aligned with attachment means for said seat panels, said foldable upper stay member, said lower support assembly, and said front wheel assemblies.

7. The wheelchair construction of claim 6 wherein said seat panels comprise a rectangular panel having two opposing linear edges and two opposing non-linear edges, a first non-linear edge comprising at least one notch formed therein bounded by extending ears having horizontal through channels linearly therethrough along a common axis, a second non-linear edge comprising a plurality of alternating notches and ears, said ears also having horizontal through channels linearly therethrough along a common axis parallel to said channels in said first ears, wherein said second non-linear edge of one panel interdigitates with said second non-linear edge of an identical panel and is joined thereto by means of a rod passing through said channels, and said at least one notch and bounding ears of said first non-linear edge interdigitate with a shaft of a first size connector element extending through said side panel, said panel being connected thereto by a rod passing through said channels in said ears and said channel in said connector shaft.

8. The wheelchair construction of claim 7 wherein said foldable stay member comprises first and second elongated bars, one end of said first bar being joined to one end of said second bar in a pivotable relationship by a common pivot pin, each bar having an attachment pivot at an end opposite said common pivot whereby said stay member is connected between said left and right side panels adjacent said backrest, such connection being effected by means of said second size connector elements extending through said apertures in said side panels whereby said attachment pivot is inserted into said channel of said connector element shaft.

9. The wheelchair construction of claim 8 wherein said foldable upper stay member further comprises latch means proximate said common pivot pin whereby said first and second bars may be latched in a mutually extended position.

10. The wheelchair construction of claim 9 wherein said attachment pivots include means to resist removal from said channels of said connector elements.

11. The wheelchair construction of claim 6 wherein said lower support assembly comprises first and second elongated pivot arms having first and second ends, a support pivot and elongated attachment pins; said first and second ends of said pivot arms each having a through channel perpendicular to the longitudinal axis of said arms and parallel to each other, said first and second pivot arms being joined in pivotable relationship about said support pivot inserted through aligned channels in said first ends of said pivot arms, said second ends of said first and second pivot arms being pivotally connected to said first and second side panels respectively at a point vertically below said seat panels whereby said second ends of said first and second pivot arms abut said first and second side panels when said chair is in use.

12. The wheelchair construction of claim 11 wherein said connection of said pivot arms to said side panels is effected by means of said attachment pins and said second size connector elements, said attachment pins pass through said channels in said second ends of said pivot arms, each end of said attachment pin being confined within a channel of said second size connector elements inserted through apertures in said side panels at locations adjacent said second ends of said pivot arms.

13. The wheelchair construction of claim 12 wherein said support pivot includes means to resist removal of said pivot arms from said support pivot shaft.

14. The wheelchair construction of claim 13 wherein said attachment pins include means to resist removal from said channels of said second size connector elements.

15. The wheelchair construction of claim 6 wherein said front wheel assemblies comprise left and right caster plates, said second size connector elements and interconnect rods, said caster plates each comprising a substantially trapezoidal plate member having opposite short and long edges, a flange extending laterally from said long edge, a vertical channel extending into said plate member from said short edge and an aperture perpendicular to and intersecting said channel whereby said caster plates are mounted to said side panels adjacent lower front corners thereof by means of said interconnect rods and said second size connector elements, a first end of said interconnect rods being confined within said channels by second size connector elements inserted through said side panels and said apertures, and a second end of said interconnect rods cooperating with second size connector elements inserted through said side panels above and rearward of said caster plates, said lateral flanges abutting the lower edges of said side panels.

16. The wheelchair construction of claim 15 further comprising foot rest assemblies attachable to said interconnect rods of said front wheel assemblies each of said foot rest assemblies comprising a foot rest attachment arm and a foot rest plate, said attachment arm comprising an elongated member having a cylindrical body at one end and an aperture at another end, said aperture being sized to accept a first size connector element whereby said foot rest plate may be pivotably attachable thereto and said cylindrical body having a longitudinal through channel for passage of said interconnect rod whereby said foot rest assembly is rotatable thereon.

17. The wheelchair construction of claim 16 said foot rest plate comprises a rectangularly planar member having laterally extending ears on one edge, said ears being spaced apart a distance equal to the width of said first size connector element and having horizontal through channels therein which align with the channel of said connector element and accept an attachment rod there through, the ends of said ears being abuttable against said attachment arm when said foot rest plate is perpendicular thereto.

18. The wheelchair construction of claim 6 wherein said backrest comprises a rectangular flexible panel having means on opposite ends whereby said panel is removably attached to said upstanding portions of said left and right side panels.

19. The wheelchair assembly of claim 6 further comprising arm rest assemblies mountable on said upstanding portions of said side panels wherein said armrest assemblies comprise an armrest and a support means releasably connected by pivotal interconnect means and wherein said side panels are provided with apertures in said upstanding portions to accept said armrest assemblies and said second size connector elements, said apertures comprising an elongated slot oriented with the longitudinal axis of said upstanding portion and a circular aperture adjacent to and separate from a lower end of said slot, said armrest assembly extending through said slot with said support means extending downward adjacent said upstanding portion and engaging said channel in said connector element.

* * * * *